July 30, 1968

R. H. ANDERSON 3,394,841

UNDERGROUND LIQUID STORAGE SYSTEM

Original Filed May 20, 1963

INVENTOR.
Robert H. Anderson
BY
Edwin C. Lehner
ATTORNEY

July 30, 1968 R. H. ANDERSON 3,394,841
UNDERGROUND LIQUID STORAGE SYSTEM
Original Filed May 20, 1963 2 Sheets-Sheet 2

INVENTOR.
Robert H. Anderson
BY
Edwin C. Lehner
ATTORNEY

United States Patent Office 3,394,841
Patented July 30, 1968

3,394,841
UNDERGROUND LIQUID STORAGE SYSTEM
Robert H. Anderson, Elmhurst, Ill., assignor to Standard Oil Company, Chicago, Ill., a corporation of Indiana
Continuation of application Ser. No. 524,374, Jan. 21, 1966, which is a continuation of application Ser. No. 281,650, May 20, 1963. This application Dec. 19, 1966, Ser. No. 603,057
1 Claim. (Cl. 220—71)

ABSTRACT OF THE DISCLOSURE

An underground liquid storage system comprises a buried single wall glass fiber-reinforced plastic tank having an elongated tubular center portion provided with a plurality of non-metallic circumferential external stiffening ribs integrally formed therein and being spaced apart in parallel, non-contiguous relationship along the longitudinal axis of said tubular portion, and outwardly curved end portions provided with a glass fiber-reinforced plastic external protective covering in spaced apart relationship to the end portion with low structural strength material filling the space between the end portion and the covering, with the covering being joined to the peripheral surface of the ribs adjacent the curved end portions; and means for introducing liquids into and removing from said tank.

---

Figure 3:
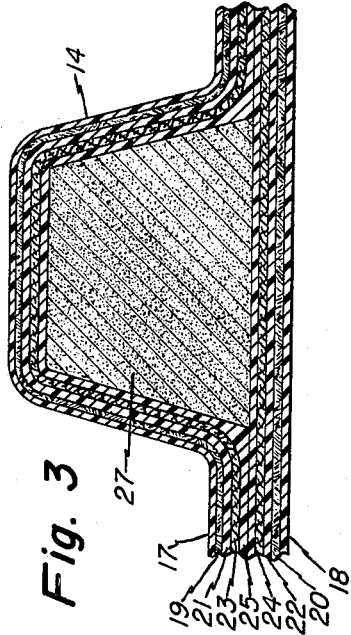

This is a continuation of application Serial No. 524,374, filed Jan. 21, 1966, now abandoned, which in turn is a continuation of application Ser. No. 281,650, filed May 20, 1963, now abandoned.

This invention relates to storage tanks. More particularly, it relates to glass fiber reinforced plastic tanks especially adaptable for underground storage of liquid hydrocarbons and to a method of preparation thereof.

The petroleum industry conventionally uses metal tanks for the underground storage of liquid hydrocarbons, such as gasoline and fuel oil, especially at service stations. As is well known, the service life of such tanks is extremely variable due to the corrosive environment in which the tanks are buried. In some areas the service life of a tank is sometimes less than one year, whereas in other areas the life of the tank may be as much as 30 years. Frequent replacement of metal tanks is required when used in highly corrosive soils or environments. Thus, large economic losses accrue both from the loss of the tank itself and from the costs incurred in its replacement. Many techniques have been suggested for protecting underground metal storage tanks against corrosion, such as painting or coating with protective materials. However, such techniques have proved unsatisfactory for protecting metal tanks against corrosion. Thus, there is a critical need in the industry for a suitable non-metallic storage tank that can be effectively used for the underground storage of liquid hydrocarbons at atmospheric pressure.

Non-pressurized storage tanks constructed from non-metallic materials must be capable of withstanding the internal and external forces which are placed upon the tank in normal use. Underground service station tanks are normally buried under the driveways and covered with about 30 inches of earth. In some locations, high water table conditions exist so that the tanks must be provided with hold-down means, which conditions impose extreme forces resulting from up-lift and hold-down. In addition, such buried tanks are subjected to periodic vehicle axle loads that may range from 15–20,000 pounds and the non-metallic tank must be capable of withstanding such periodic loads without damage or deformation. A suitable non-metallic tank for such purposes must have all of the desirable characteristics and qualifications of metal tanks as well as being chemically inert to the contents and to the environment in which it is placed. Further, the capacity of the non-metallic storage tanks should be equivalent to the capacity of the metal tanks which normally ranges from 500 to 10,000 gallons.

An object of the invention is to provide a non-metallic storage tank suitable for storage of liquids at atmospheric pressure. A further object of the invention is to provide a glass fiber reinforced plastic tank suitable for the underground storage of gasoline and fuel oil. A still further object of the invention is to provide a method for making a strong, rigid, hollow tank of novel construction, which is fluid-tight and not subject to corrosion.

In accordance with the present invention, a non-metallic horizontal storage tank especially suitable for the underground storage of liquid hydrocarbons is provided by a shell of a glass fiber reinforced plastic having an elongated tubular center portion and curved ends defining a substantially closed hollow structure. The tubular center portion of said shell is structurally reinforced against deformation by a plurality of outwardly projecting peripheral stiffening ribs in the outer portion of said shell with the ribs being spaced at intervals along the longitudinal axis of the tubular portion.

Figure 1:
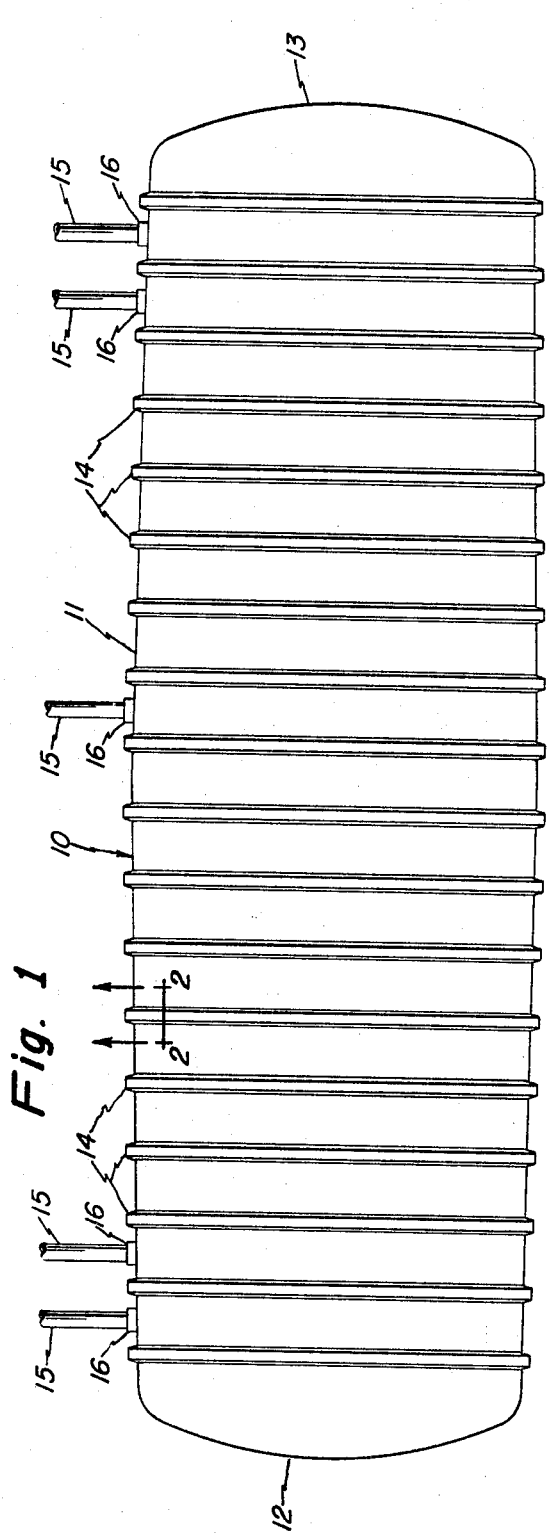
Figure 2:
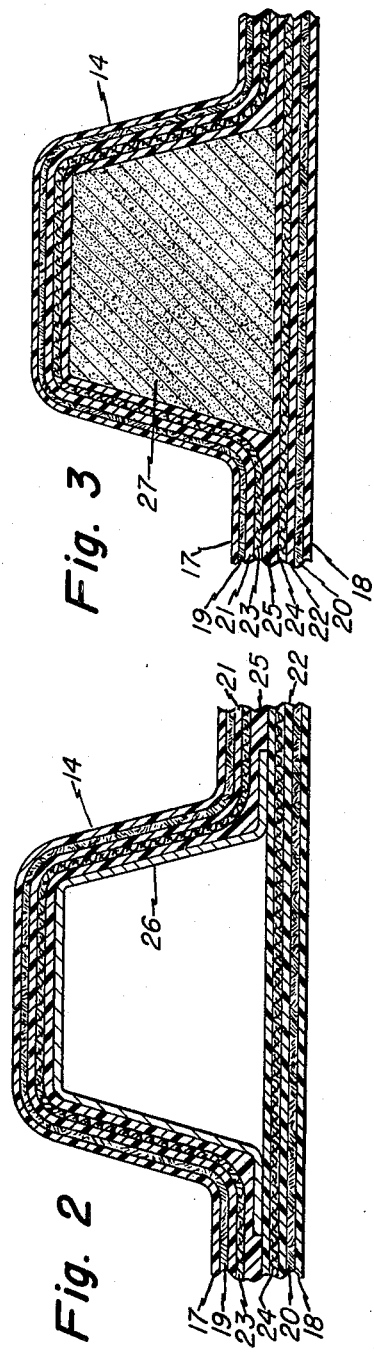
Figure 4:
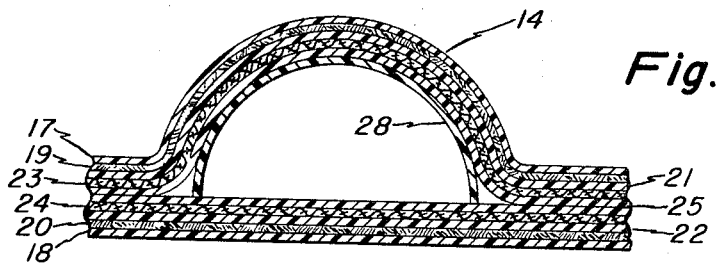
Figure 5:
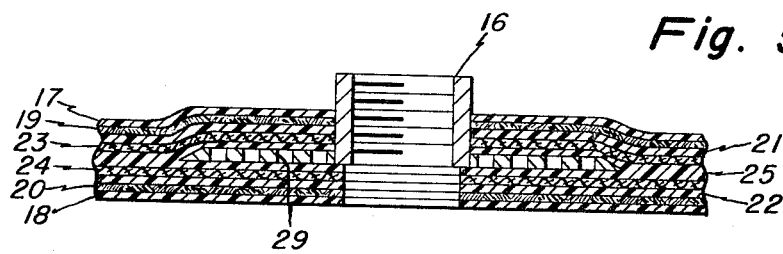
Figure 6:
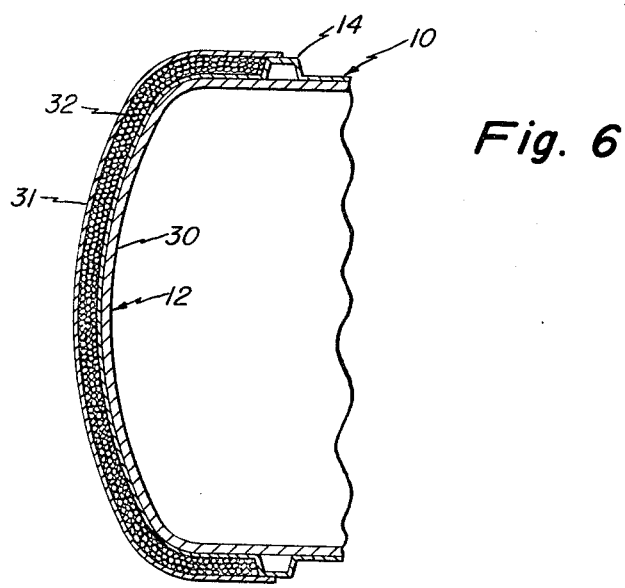

For a more complete understanding of the present invention, reference is made to the accompanying drawings where like reference numerals refer to like parts throughout the views, in which: FIG. 1 is a side view of the completed tank of this invention; FIG. 2 is a cross-sectional view on an enlarged scale taken at line 2—2 of FIG. 1 illustrating the laminated plastic shell and preferred shape of stiffening rib integral therewith; FIG. 3 illustrates an alternative embodiment of rib construction; FIG. 4 illustrates another alternative embodiment of rib construction; FIG. 5 illustrates the attachment of metal fittings in the shell; and FIG. 6 is a cross-sectional view of an end provided with a protective sandwich.

Referring to FIG. 1, 10 designates the preferred embodiment of the non-metallic tank of the invention consisting of a shell of a glass fiber reinforced plastic having a tubular center 11 portion and outwardly curved ends 12 and 13. Outwardly projecting circumferential stiffening ribs 14 are spaced in parallel relationship along the longitudinal axis of said tubular portion 11 to provide said tubular portion with rigidity and strength against deformation. Tank 10 is provided with a plurality of inlet and outlet pipes 15 connected to said shell by fittings 16. The ends can be curved inwardly or outwardly and be of dished or hemispherical form.

The shell and rib structure illustrated in FIGS. 2–4 comprises thermoset resin layers 17 and 18, glass fiber surfacing mats 19 and 20, and interposed between thermoset resin layers 21 and 22 are a plurality of plies or reinforcing glass fibers 23 and 24 which are impregnated with and intimately bonded in thermoset resin layers 21, 22 and 25. Rib 14 as shown in FIG. 2 contains element 26 which is a preformed core of fiber glass-thermoset resin inserted between plies 23 and 24 for the purpose of forming the hollow rib. In FIG. 3, element 27 is a preformed core of solid low density non-structural material that can be inserted between plies 23 and 24 to form rib 14. Preferably, strengthening rib 14 is of trapezoidal cross-sectional form as shown in FIGS. 2 and 3. An alternative cross-sectional form for strengthening rib 14 is shown in FIG. 4 wherein a hemispherical element 28 of either hollow or solid construction of low density non-structural material is inserted between plies 23 and 24 to provide the form of the rib.

FIG. 5 illustrates means for attaching internally threaded metal fittings 16 to the tank shell. Fitting 16 is attached, preferably by welding, to a perforated metal plate 29. Plate 29 is embedded between plies 23 and 24 in the shell to provide a unitary structure, that is protected against corrosion.

The shell of a glass fiber reinforced plastic has been illustrated in FIGS. 2–5 as consisting of two plies of glass reinforcing material for illustrative purposes. It is to be understood that any number of plies can be used depending on tank size and its use.

The sandwich construction illustrated in FIG. 6 provides protection for the curved end 12 of the tank 10. The sandwich comprises an inner skin 30 consisting of the tank shell and an outer skin 31 consisting of a glass fiber plastic spaced therefrom and attached to rib 14 adjacent the curved end. The space between skins 30 and 31 is filled with a core material 32 of relatively low structural strength, such as foamed polystyrene or urethane.

The glass fiber reinforced plastic forming the tank shell is preferably composed of about 25–40% glass fiber reinforcing material embedded in about 60–75% thermoset resin. Conventional thermosetting resins known to the art can be used, such as epoxy or unsaturated polyesters. The preferred thermosetting resin is a polymerizable mixture of about 55–65 parts of unsaturated isophthalic acid polyester resin and about 35–45 parts of styrene. The preferred polyester resin is prepared conventionally from 1 mole isophthalic acid, 1 mole of maleic anhydride and 2.2 moles of propylene glycol, and has an acid number of less than 15 and a hydroxyl number less than 30. Catalytic curing of the thermosetting resin is used to form the thermoset plastic in accordance with conventional curing techniques. The preferred catalyst system for the isophthalic polyester-styrene thermosetting resin is about 0.2% cobalt naphthenate and about 1% methylethyl ketone peroxide. It is to be understood that choice of fabrication techniques, glass, and thermosetting resin content of the shell can be varied broadly and still give the proper chemical inertness and structural strength to the tank.

The tank of the invention is preferably made in accordance with the hand-lay technique used in the plastics industry wherein a mandrel having the desired configuration is used to form a half section of the tank. The half sections are subsequently joined to form the unitary tank structure illustrated in FIG. 1. The shell of glass fiber reinforced plastic is formed on the mandrel by laying up alternate plies of polymerizable thermosetting resin and glass reinforcing material, such as woven glass fabric, woven glass roving, woven glass spun roving or chopped glass impregnated with the resin. It is important that the inner and outer surfaces of the shell be substantially pure thermoset resin to eliminate possible wicking of liquids along the fiber surfaces. During the formation of the shell, a plurality of outwardly projecting peripheral stiffening ribs are formed in and from one or more of the outer plies of the shell. To aid in the formation of the ribs, preformed cores of desired shape, either of hollow or solid construction, are inserted in the plies at spaced intervals along the longitudinal axis of the shell and the outer plies then formed thereover to produce the stiffening rib integrally in the shell. After sufficient plies of the resin impregnated glass fibers are laid up to form the desired thickness in the shell, the thermosetting resin glass fiber mixture is then cured to form a solid glass fiber reinforced plastic. Curing can be effected at room temperature or at elevated temperatures. Improved chemical resistance is obtained when the polymerizable resin is cured at elevated temperatures. It is to be understood that the outer resin surface is to be protected against air inhibition during the curing step to obtain satisfactory cure. In order to form a plastic tank having the requisite structural strength and chemical inertness of the size and capacity for underground storage of gasoline and fuel oil in service stations, it is essetnial that the peripheral circumferential stiffening ribs be integrally formed in the shell so as to provide a tank having an even and uninterrupted inner surface.

A plastic tank having a capacity of about 4,000 gallons is about 20 feet long and 6 feet in diameter. Parallel circumferential peripheral stiffening ribs, having trapezoidal cross-sectional configuration, located on about 12 inch centers along the tubular portion of the tank, yield a tank having equivalent structural strength to a ferrous metal tank of similar dimensions. The shell of such tank is about ¼ to ⅜ inch thick and has a plurality of plies of glass reinforcing material in the cured thermosetting resin. The ribs formed in the outer plies extend approximately 1.5 inches radially outward from the outer surface of the shell and have an average top width of about 1.5 inches.

Horizontal plastic tanks made in accordance with this invention are unitary structures free from corrosive attack by environment and contents. The tank has high strength to unit weight and does not require the protective techniques or coatings that metal tanks require. Products stored in the plastic tanks are free from contamination by the normal products of corrosion of internal surfaces of metal tanks. Frequent and expensive replacement of metal tanks in service stations located in highly corrosive areas is obviated by the plastic tanks of the invention.

The tanks of this invention can also be used for the storage of other liquids either above or below ground level so long as the liquids do not attack the plastic. For example, the tank can be equipped with cradle-type supports and covered with insulating material for use as above ground storage of water. Tanks of similar configuration, but of smaller capacity, can be used for residential storage of fuel oils.

I claim:
1. An underground liquid storage system comprising in combination;
 (A) a rigid preformed substantially impervious non-metallic glass fiber-reinforced plastic storage tank being maintained at atmospheric pressure beneath the surface of the earth, said tank consisting of
  (i) a glass fiber-reinforced plastic shell having an elongated tubular center portion and outwardly curved end portions defining a closed hollow structure;
  (ii) said shell consisting of a single unitary wall of glass fiber-reinforced plastic;
  (iii) inlet and outlet ports in said wall;
  (iv) the wall of said tubular portion having an even inner surface and a plurality of non-metallic circumferential stiffening ribs integrally formed therein, said ribs projecting radially outward from the center surface of said wall to structurally reinforce said tubular portion against deformation and being spaced apart in parallel, non-contiguous relationship along the longitudinal axis of said tubular portion;
  (v) the outwardly curved end portion of said shell having a protective covering consisting of an external skin of glass fiber-reinforced plastic in spaced apart relationship to said shell, and core material of relatively low structural strength filling the space between said shell and said skin, said external skin being joined to the peripheral surface of said stiffening rib adjacent said curved end portion.
 (B) means for introducing liquids into and removing said liquids from said tank, said means connected to said inlet and outlet ports; and
 (C) an underground cavity having the soil walls thereof in intimate contact with the external surface of said tank shell, said cavity walls and said tank shell being in cooperative engagement to substantially minimize deformation of said shell by external deformational forces.

References Cited

UNITED STATES PATENTS

| | | | |
|---|---|---|---|
| 2,373,270 | 4/1945 | Skolnik | 220—71 XR |
| 2,398,828 | 4/1946 | Gray | 220—18 XR |
| 2,594,693 | 4/1952 | Smith | 220—83 |
| 2,777,626 | 1/1957 | French | 220—83 XR |
| 2,779,702 | 1/1957 | Wilson et al. | 220—63 |
| 2,983,403 | 5/1961 | Mauser | 220—71 XR |
| 3,124,001 | 3/1964 | Conley | 220—83 XR |

FOREIGN PATENTS 1,162,473  4/1958  France.

RAPHAEL H. SCHWARTZ, *Primary Examiner.*